United States Patent [19]

Himmler

[11] 4,004,464
[45] Jan. 25, 1977

[54] METHOD AND TRANSDUCER AND APPARATUS FOR SELECTIVELY MEASURING OSCILLATION COMPONENTS FROM AN OSCILLATION SPECTRUM

[75] Inventor: Günther Himmler, Darmstadt, Germany

[73] Assignee: Gebr. Hofmann KG Maschinenfabrik, Darmstadt, Germany

[22] Filed: Aug. 12, 1975

[21] Appl. No.: 603,970

[30] Foreign Application Priority Data

Aug. 14, 1974 Germany .......................... 2439072

[52] U.S. Cl. .................... 73/462; 73/71.4
[51] Int. Cl.² .......................... G01M 1/22
[58] Field of Search ........... 73/462, 464, 71.4, 71.2

[56] References Cited

UNITED STATES PATENTS

| 2,785,356 | 3/1957 | Nisle | 73/71.4 X |
| 2,990,717 | 7/1961 | Federn | 73/463 |
| 3,151,485 | 10/1964 | Federn et al. | 73/463 X |
| 3,724,279 | 4/1973 | Wolley | 73/462 |
| 3,917,936 | 11/1975 | Reader | 73/71.4 |

Primary Examiner—James J. Gill
Attorney, Agent, or Firm—Cushman, Darby & Cushman

[57] ABSTRACT

A method and apparatus for selectively measuring oscillation components and vectors in a spectrum, particularly produced by detecting unbalance of a rotary body, with a transducer which includes a pair of coils which move in an alternating magnetic field having an adjustable frequency and an integrating circuit connected to the transducer output so that the desired components are selected in the transducer and integrating circuit.

9 Claims, 3 Drawing Figures

METHOD AND TRANSDUCER AND APPARATUS FOR SELECTIVELY MEASURING OSCILLATION COMPONENTS FROM AN OSCILLATION SPECTRUM

The invention relates to a method, a transducer and apparatus for selectively measuring oscillation components from an oscillation spectrum.

Measurement value pick-up means or transducers have been designed for picking up or detecting at their input a mechanical oscillation spectrum and at their output to deliver an output voltage which is an analog of the mechanical signal. When the transducer is used in a machine for determining unbalance of a rotary body, the oscillation spectrum is identical to the oscillations produced by the reaction at the mountings by which the rotary body is supported in the machine. As, of the entire oscillation spectrum, generally only the unbalance oscillation, at the rotary body frequency, is of interest, since it serves as an information carrier, the output signal is amplified in an electronic measuring unit and subsequently selected according to the rotary body frequency, by means of a known electronic circuit. In previously proposed apparatus for oscillation detection, for example in unbalance-measuring machines, the electronic measuring unit includes, between the input amplifier and the selection circuit proper, electronic framework calculators which are connected as analog calculators. These are provided for converting the unbalance measurement signals delivered by the electrodynamic transducers to the previously determined balancing planes of the body to be balanced.

As the entire oscillation spectrum is amplified in the amplifiers of the electronic measuring unit and the conversion circuit connected to the input of the selection circuit, the actual operation of selecting the unbalance oscillation is made more difficult, as all interference signals in the oscillation spectrum will also be amplified, while theoretically precise selection is also made more difficult in the selection circuit.

According to the present invention, there is provided a method of selectively measuring oscillation components and oscillation vectors in an oscillation movement spectrum, comprising sensing the oscillation movements by an electrodynamic transducer, wherein the selection operation is effected in the transducer and in an integrating means connected to the output of the transducer.

It will be seen hereinafter that this method can provide that only the signal which is really of interest is present as a highly selective signal in the electronic measuring unit, and can be further processed.

The signal selection operation can be carried out in such a way that an electrical alternating-current voltage is obtained from the alternating effect of an induction device which is moved at the frequency of the oscillations to be measured, with a magnetic alternating field at an adjustable frequency which is kept constant, thus being a selection frequency. The electrical alternating-current voltage obtained is integrated, the integrated voltage thus being proportional to the amplitude of the oscillation components which are of interest and which are selected by the above-mentioned constant frequency of the alternating magnetic field.

In addition, when measuring unbalance of a rotary body, a sine-related and a cosine-related voltage can be obtained from the transducer or detector which detects the oscillations caused by the unbalance, these two voltages being used to determine two unbalance vector components. Two electrical alternating-current voltages which represent the two unbalance vector components determined, at the frequency at which the unbalance is determined, can be vectorially added, so that the phase position of the unbalance on the body can be determined by phase comparison between the signal produced from the vectorial addition operation, and a reference voltage obtained from the rotary movement of the rotary body to be balanced, for example by sensing a mark on the body, which acts as a datum position to which the unbalance position can be related.

The invention further provides apparatus for selectively measuring oscillation components and oscillation vectors in an oscillation movement spectrum comprising: a transducer for sensing the oscillation movements, the transducer including means for producing an altenating magnetic field and at least one moving coil operatively connected to the alternating magnetic field, the frequency of the alternating magnetic field being adjustable to a constant value; and an integrating means connected to the output of the transducer.

It may be of advantage, when measuring unbalance for example, for the frequency of the alternating magnetic field in the transducer, or measurement value pick-up means, to correspond to the rotary body frequency, such as the balancing frequency.

In order to produce alternating current voltages which correspond to the unbalance vector components, multiplying means can be connected to the output of the integrating means, for multiplying the direct-current voltage at the outputs of the integrating means with the sine and cosine alternating-current voltages corresponding to the rotary body frequency.

In another embodiment of the invention, for the purposes of determining the phase position of the unbalance on a rotary body, summing means can be connected to the output of the multiplying means, for geometrically summing the alternating-current voltages produced at the output of the multiplying means. Phase comparison circuits can be connected downstream of the summing means, for determining the phase position of the unbalance relative to a datum position on the rotary body, by a comparison operation.

In one embodiment, a transducer or measurement value pick-up means which can be used in the above-defined method of the invention or form part of the apparatus of the invention, two moving coils are arranged in mirror image to each other on a common sensing rod and symmetrically with respect to a central plane, that is perpendicular to the longitudinal dimension of the sensing rod, the coils being movable in two phase-displaced alternating magnetic fields.

A method and apparatus according to the present invention will now be described by way of example with reference to the accompanying drawings, in which.

Figure 1:
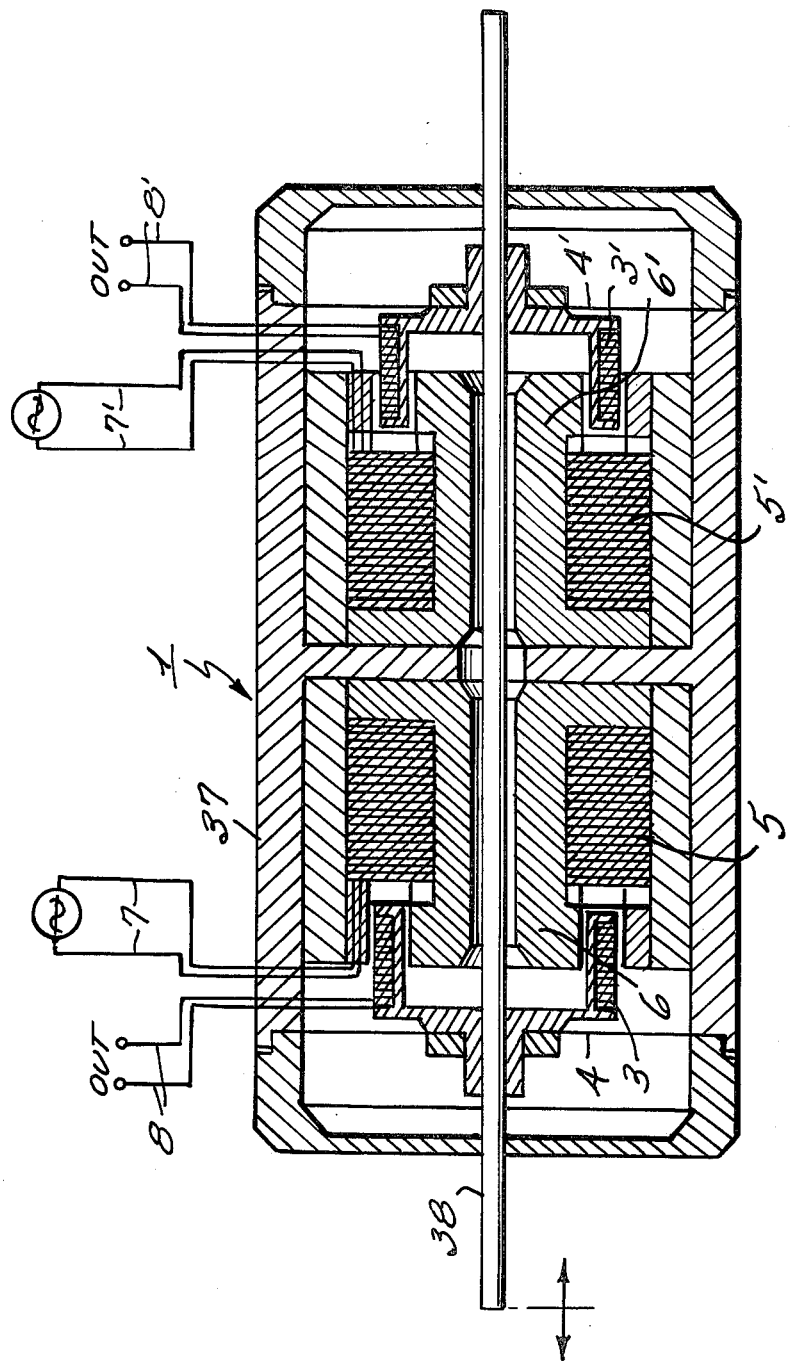
FIG. 1 shows a view in cross-section of a preferred embodiment of a measurement value pick-up means or transducer.

A measurement value pick-up means or transducer 1 as shown in FIG. 1 is designed for detecting at its input the oscillating movement of an oscillating body such as a rotary body suffering from unbalance, and for producing a signal representative of such oscillation, for example an output voltage that is an analog of the input signal. The device comprises a housing 37, and a sensing rod 38 which is connected to the oscillatable body; for example in an unbalance-measuring machine in which a rotary body is rotated to determine any unbalance thereof, the sensing rod 38 may be connected to an oscillatable bearing or mounting by which the rotary body is supported in the machine. Induction coils 3 and 3' are fixedly connected to the sensing rod 38, and the sensing rod is longitudinally movably mounted for example by diaphragm springs 4. Energization induction coils 5 and 5' are provided for producing a periodic alternating magnetic field, while soft iron packs 6 and 6' are provided as a core for carrying the magnetic field. The moving coils 3 and 3' which move perpendicularly to the direction of the magnetic field, the coils 5 and 5' and the soft iron packs 6 and 6' are coaxially arranged around the sensing rod 38, and the arrangement is in mirror image or symmetrical with respect to a central plane of the measurement value pick-up means 1, which plane is perpendicular to the longitudinal dimension of the sensing rod 38.

Electric leads 7 and 7' are connected to the coils 5 and 5' for supplying the sinusoidal energization current which produces the periodic alternating magnetic field. The energization current will be of adjustable frequency to produce a constant but variable frequency of alternating magnetic field. Leads 8 and 8' are connected to the moving coils 3 and 3', for the voltages induced therein. It will be noted that the output voltage induced in the coils when movement of the coils occurs is proportional to the product of the induction of the magnetic field, the conductor length of the winding of the moving coils and the speed at which the coils are moved by the mechanical oscillations applied to the sensing rod. Accordingly, multiplication of the induction by the constant but continuously adjustable frequency and the respective speed of the oscillation spectrum of the coil movement occurs in the transducer 1.

It is alternatively possible, in a modified form of the device, not to have the mirror-image arrangement, that is to say, the device has only a sensing rod 38, a lead 7 for the energization current, a lead 8 for the induced voltage, a moving coil 3, a soft iron core 6, and an induction coil 5 for producing the alternating field. With such arrangement it is then possible to effect amplitude measurement of the oscillation.

Further reference to operation of the FIG. 1 device will be made below.

Figure 2:
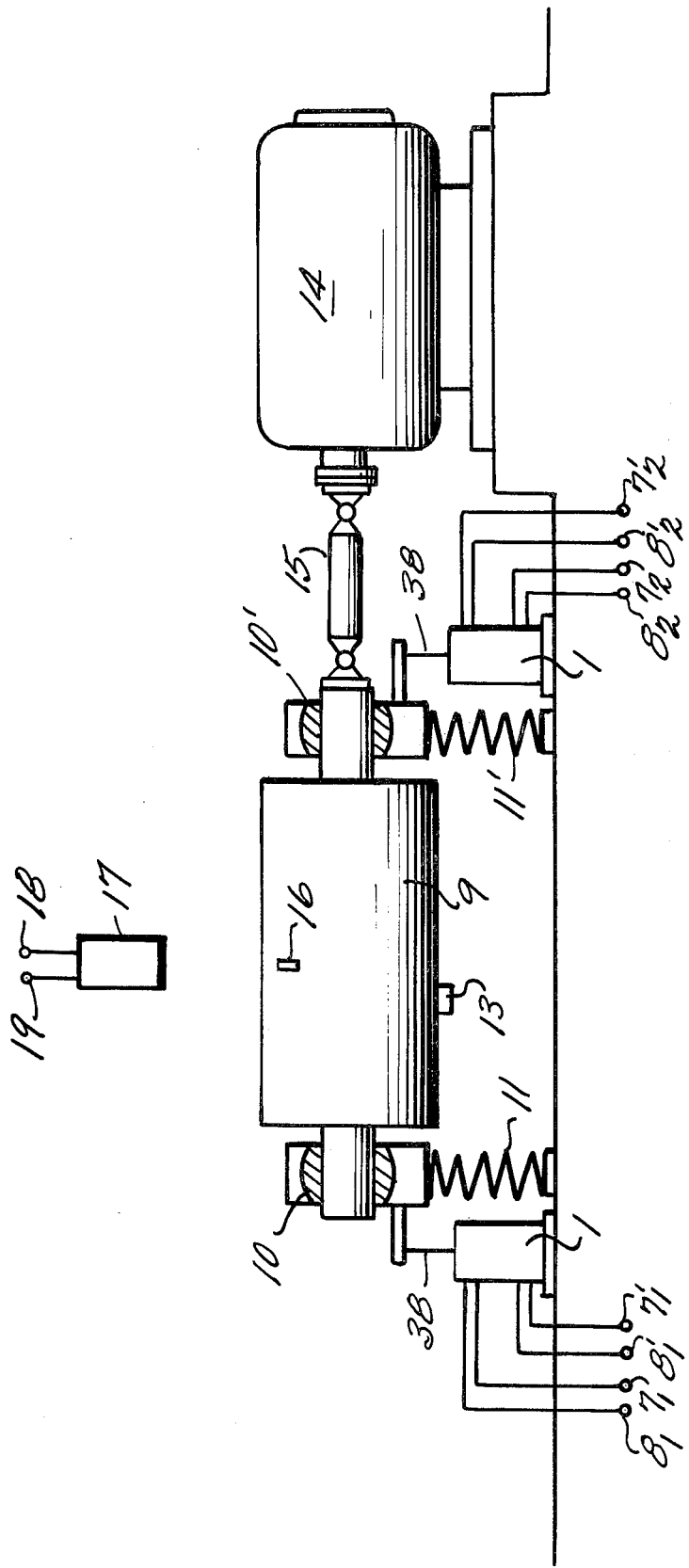
FIG. 2 is a diagrammatic view of an unbalance measuring apparatus including the transducer of FIG. 1.

FIG. 2 shows a measuring apparatus for measuring unbalance on a rotary body 9. The rotary body 9 is mounted by oscillatable mountings 10 and 10' connected to a foundation 12 by way of springs 11 and 11'. The movements of the mountings 10 and 10' as a result of an unbalance of the body 9, as denoted at 13, are detected by the sensing rods 38 of the two measurement value pick-up means 1. The rotary body is driven for example by a motor 14 by way of a universally jointed shaft 15. In FIG. 2, the left-hand pick-up means 1 has outputs $8_1$ and $8'_1$ and supply leads $7_1$ and $7'_1$ for the energization current, while the right-hand pick-up means has outputs $8_2$ and $8'_2$ and supply leads $7_2$ and $7'_2$ for the energization current.

The rotary body carries a reference mark 16 provided for producing a reference voltage when determining the phase position of the unbalance, by the mark 16 being sensed by a photoelectric sensing means 17 with an electrical output 18 and a supply input 19. Other devices can be used for this purpose, for example synchronous means.

Figure 3:
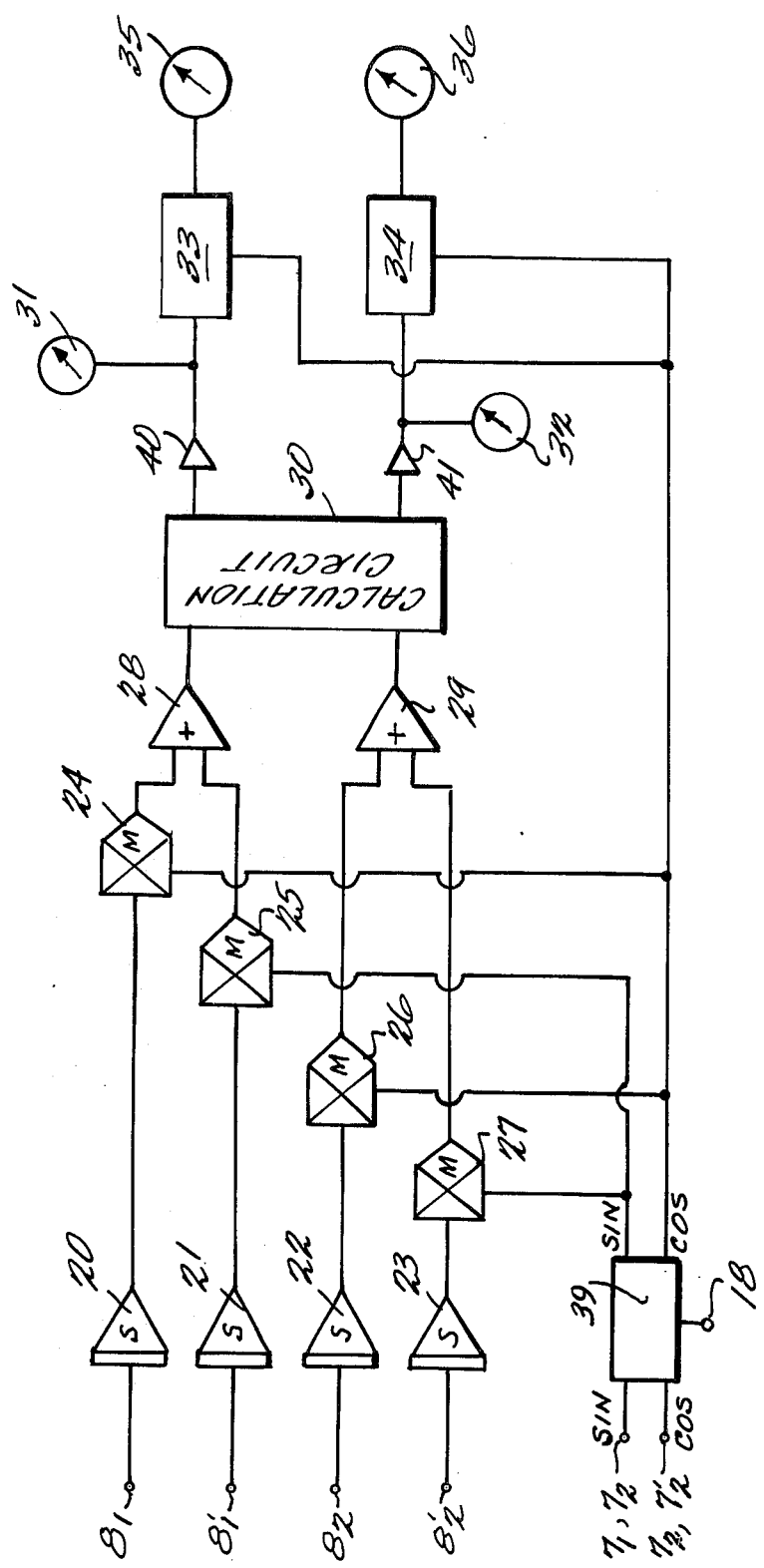
FIG. 3 is a block circuit diagram showing the electronic processing of the voltages produced from the measurement value pick-up means of FIG. 1.

Referring to the block circuit diagram in FIG. 3 in conjunction with the FIG. 2 apparatus, integrating means 20 and 21 are connected to the outputs $8_1$ and $8'_1$ of the left-hand pick-up means 1 of FIG. 2 while integrating means 22 and 23 are connected to the outputs $8_2$ and $8'_2$ of the right-hand pick-up means 1 of FIG. 2. At the output of the integrating means 20, 21, 22 and 23 will appear an output voltage of constant magnitude, which voltages are proportional to the oscillating movements of the moving coils 3 and 3', as will be described in greater detail hereinafter.

The FIG. 3 circuit also includes multiplying means 24, 25, 26 and 27 which, from the direct-current voltages at the outputs of the integrating means 20 to 23, determine the magnitude and the phase position of the unbalance 13 of the rotary body 9, in the form of vectors, by the said direct-current voltages being converted into periodic alternating-current voltages. More specifically, as indicated in FIG. 3, a sine and cosine voltage of constant magnitude at the unbalance-measuring frequency is produced in a signal former 39 from the reference pulse at the output 18 of the sensing device 17. Thus the direct-current voltages appearing at the outputs of the integrating means 20 to 23 are multiplied by the above-mentioned sine and cosine voltages, so that alternating-current voltages appear at the outputs of the multiplying means 24 to 27, such voltages being at unbalance-measuring frequency and being proportional in respect of their magnitude to the unbalance components which have been obtained from the integrating means 20 to 23.

The output signals of the multiplying means 24 and 25 are added vectorially in a summing means 28, while the same occurs in a summing means 29 for the output signals of the multiplying means 26 and 27.

Connected to the outputs of the summing means 28 and 29 is a per se known electrical framework calculation circuit 30 which converts the signals applied thereto, to the corresponding balancing planes of the rotary body. Connected to the outputs of circuit 30 are respective amplifiers 40 and 41 for amplifying the output signals. Instruments 31 and 32 for displaying the magnitude of the unbalance in the left-hand balancing plane and the magnitude of the unbalance in the right-hand balancing plane respectively are connected to the outputs of the amplifiers 40 and 41.

In order to determine the phase position of the unbalance 13 with reference to the reference signal which is produced by sensing of the mark 16 by the sensing means 17 and which is processed in the signal former 39, the phase positions of the unbalance signals from the summing means 28 and 29, present at the outputs of the amplifiers 40 and 41, are processed in phase comparison circuits 33 and 34, and compared to the reference signal coming from the signal former 39. The phase position of unbalance in the left-hand balancing plane is indicated at an instrument 35 and the phase position of balance in the right-hand balancing plane is indicated at an instrument 36.

The mode of operation of the device of FIG. 1 and the apparatus of FIG. 2 will now be described in greater detail with reference to the following physical relationships:

U(t) = voltage induced in the moving coil 3 or 3'
B(t) = induction of the magnetic field $$\left[\int_o^{Tn} U(t)\cdot dt\right]_x = l\cdot Bo \int_o^{Tn} \cos n\omega t \cdot \left(\sum_1^m a_m \cdot \cos m\omega t + \sum_1^m b_m \cdot \sin m\omega t\right) dt \qquad (7)$$

B(o) = maximum value of induction
F(t) = Fourier sum of the oscillation movement (spectrum of oscillation movement to be detected)

$$\int_o^T \sin n\omega t \cdot \cos m\omega t \cdot dt = 0 \text{ for } n \lessgtr m \qquad (8)$$

$$\int_o^T \cos n\omega t \cdot \cos m\omega t \cdot dt = \begin{matrix}(0, m \neq n \\ (\pi, m = n \neq 0\end{matrix} \qquad (9)$$

$$\int_o^T \sin n\omega t \cdot \sin m\omega t \cdot dt = \begin{matrix}(0, m \neq n \\ (\pi, m = n \neq 0\end{matrix} \qquad (10)$$

With these equations for equation 6:

$$\left[\int_o^{Tn} U(t)\cdot dt\right]_y = l\cdot Bo \cdot b_n \int_o^{Tn} \sin n\omega t \cdot \sin n\omega t \cdot dt = \pi \cdot l \cdot Bo \cdot bn \qquad (11)$$

For equation 7 we then have:

$$\left[\int_o^{Tn} U(t)\cdot dt\right]_x = l\cdot Bo \cdot a_n \int_o^{Tn} \cos n\omega t \cdot \cos n\omega t \cdot dt = \pi \cdot l \cdot Bo \cdot a_n \qquad (12)$$

$l$ = conductor length of the coil
$m > n$ $$U(t) = B(t)\cdot l\cdot [ds(t)dt] \qquad (1)$$

$B(t) = Bo.\sin n\omega t$ for sine-shaped induction (2a)

$B'(t) = Bo.\cos n\omega t$ for cosine-shaped induction (2b)

In respect of the speed $v(t)$ of the oscillation spectrum, we have:
$$v(t) = [ds(t)/dt] \qquad (3)$$

and, as the Fourier sum for the individual partial oscillations without static component, as this only concerns periodic movements, we have:

$$v(t) = \sum_1^m a_m \cdot \cos m\omega t + \sum_1^m b_m \cdot \sin m\omega t \qquad (4)$$

By inserting equations 2a and 4 in equation 1 we have:

$$U(t) = Bo \cdot \sin n\omega t \cdot l \cdot \left(\sum_1^m a_m \cdot \cos m\omega t + \sum_1^m b_m \cdot \sin m\omega t\right) \qquad (5)$$

and, after integration, over a period of the oscillation, of $o$-$Tn$ at the frequency $n\omega$ with sine relation:

$$\left[\int_o^{Tn} U(t)\cdot dt\right]_y = l\cdot Bo \int_o^{Tn} \sin n\omega t \cdot \left(\sum_1^m a_m \cdot \cos m\omega t + \sum_1^m b_m \cdot \sin m\omega t\right) dt \qquad (6)$$

and in the same manner as regards oscillation with cosine relation:

These voltages appear at the outputs 8 and 8' of the measurement value pick-up means 1. Orthogonality conditions 8, 9 and 10 as follows apply:

As $a_n$ and $b_n$ are the amplitudes of the speed components of the oscillation at frequency $n\omega$, we have the amplitudes of these oscillations at $S_{an} = an/n$ and $S_{bn} = bn/n$.

The oscillation movement $S_{an}$ is proportional to the balance component $\epsilon_x$, and the same applies as regards $S_{bn}$, which is proportional to $\epsilon_y$.

From equations 11 and 12 we then have the voltage at the output of the integrating means 20 to 23 for the unbalance components:

$$\bar{U}_y = \pi \cdot l \cdot Bo \cdot S_{bn} \cdot n\omega \text{ and } \bar{U}_x = \pi \cdot l \cdot Bo \cdot S_{an} \cdot n\omega TM(13)$$

with the simplification $$\bar{U}_y = K\cdot\epsilon_y \text{ and } U_x = K\cdot\epsilon_x \qquad (14)$$

wherein $K = \pi.l.Bo$.

As $\epsilon_x$ and $\epsilon_y$ are components of the unbalance vector $\epsilon$, these also include the information about the phase position of the unbalance with respect to the reference phase of the marking 16 on the rotary body 9. The same also applies as regards the voltages $\bar{U}_x$ and $\bar{U}_y$.

$$\bar{U}_x = K\cdot\epsilon_x = \bar{U}\cdot\cos\phi = K\cdot\epsilon\cdot\cos\phi$$

$$\bar{U}_y = K\cdot\epsilon_y = \bar{U}\cdot\sin\phi = K\cdot\epsilon\cdot\sin\phi \qquad (15)$$

The amplitude of the unbalance vector then becomes:

$$\epsilon = \sqrt{\epsilon_x^2 + \epsilon_y^2} = K \cdot \sqrt{\overline{U}_x^2 + \overline{U}_y^2}$$

and the angle $tg\phi = \overline{U}_y/\overline{U}_x$

The angle $\phi$ can then be determined by phase comparison of the sinusoidal voltage representing the unbalance position with the sinusoidal reference signal which is produced by sensing the reference point 16 on the rotary body 9.

The method described in this specification is not restricted only to the rotary body frequency $n = 1$, but can also be used for oscillation analysis of the spectrum. Thus for example for studying parameters, for example oscillations caused by mounting or rotary body anisotropy, the frequency $n = 2$ may be suitable. It is also possible to examine ball bearing disorders. For the purposes of producing the sinusoidal energisation current for producing the alternating magnetic field in the measurement value pick-up means 1, frequency multipliers can be used, in conjunction with rotary body sensing and signal forming, or variably controllable frequency generators can be employed.

In the method and apparatus described above, due to the early selection of the oscillation spectrum, to select the oscillation components which are of interest for example when measuring unbalance of a rotary body, the measuring errors which can influence the accuracy of the whole measuring train can be kept low, thus increasing the precision of measurement. When carrying out the method described above, an orthogonal functional system is preferably provided for the measurement signal, to ensure satisfactory selection of the desired oscillation components. In this case the full efficiency of an electrodynamic transducer as described above which is based on the induction principle can be utilized to the greatest extent.

After integration in the integrating means downstream of the transducer, it will be seen that the system provides an output value that is greater than zero only when the frequency of the magnetic field has the same oscillation frequency as a harmonic oscillation of the movement of the moving coils of the transducer.

This can therefore provide the advantage that, out of the entire available oscillation spectrum of the moving coil movement, only the oscillation component which coincides with or can be associated with the preselected adjusted frequency of the alternating magnetic field in the transducer is processed. If the frequency of the alternating magnetic field in the transducer is identical to that of the rotary speed of the out-of-balance body to be measured, the output voltage is proportional to the magnitude of the unbalance.

What we claim is:

1. A method of selectively measuring oscillation components and oscillation vectors of a rotor in an oscillation spectrum with a transducer, comprising the steps of applying the oscillation movement to an induction device forming part of the transducer, providing a magnetic alternating field having an adjustable frequency which is kept constant at an integral multiple of the rotor frequency, producing from the operating movement of the induction device in the magnetic field an electrical alternating current voltage and integrating said voltage to produce a signal which is proportional to the amplitude of the oscillation component which is selected by the set adjustment of said constant frequency.

2. A method according to claim 1, further including producing a sine-related and a cosine-related reference voltage by detecting the output of the transducer produced by said rotor and combining said sine-related and cosine-related voltages with the integrated voltages to produce electrical alternating-current voltages at unbalance measuring frequency and to determine two unbalance vector components.

3. A method according to claim 2 including producing and vectorially adding two said electrical alternating-current voltages at unbalance-measuring frequency, which respectively represent said two unbalance vector components, and determining the phase position of the unbalance by phase comparison of the signal produced from the vectorial addition operation, with one of said reference voltages.

4. Apparatus for selectively measuring oscillation components and oscillation vectors of a rotor in an oscillation movement spectrum comprising:

a transducer for sensing the oscillation movements of said rotor, said transducer including means for producing an alternating magnetic field and at least one moving coil operatively connected to the alternating magnetic field, the frequency of the alternating magnetic field being adjustable to a constant value at an integral multiple of the rotor frequency; and integrating means connected to the output of the transducer for providing an integrated signal.

5. Apparatus according to claim 4, wherein the transducer includes means for producing a sine-related voltage and a cosine-related reference voltage from said rotor.

6. Apparatus according to claim 5 wherein said integrating means produces a plurality of current voltage outputs further including multiplying means connected to the output of said integrating means for multiplying the direct-current voltages delivered at the respective outputs of the integrating means by said sine and cosine alternating-current reference voltages corresponding to the rotary body frequencies.

7. Apparatus according to claim 6 further including summing means connected to the output of the multiplying means for geometrically summing the alternating-current voltages delivered by the multiplying means; and phase comparison means connected to the output of said summing means, for determining the phase position of the unbalance of the rotary body from the phase relation between said reference voltages and the summed voltages.

8. Apparatus according to claim 4 including two induction coils for forming two alternating magnetic fields which lie in mirror image to each other, and two moving coils which are movable in equal phase in the alternating magnetic fields.

9. Apparatus according to claim 8 wherein said moving coils are arranged on a common sensing rod and are arranged symmetrically with respect to a central plane that is perpendicular to the longitudinal dimension of the sensing rod.

* * * * *